United States Patent
Hayward et al.

(12)
(10) Patent No.: US 6,272,649 B1
(45) Date of Patent: Aug. 7, 2001

(54) METHOD AND SYSTEM FOR ENSURING CACHE FILE INTEGRITY

(75) Inventors: David Hayward, San Francisco; John Kennedy Calhoun, Sunnyvale; Steve Swen, Cupertino, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/162,318

(22) Filed: Sep. 28, 1998

(51) Int. Cl.$^7$ ........................................................ G06F 11/10
(52) U.S. Cl. .................. 714/6; 707/201; 711/141
(58) Field of Search ........................ 707/200, 201, 707/203, 104; 714/6, 819; 711/141

(56) References Cited

U.S. PATENT DOCUMENTS 5,845,128 * 12/1998 Noble et al. .
5,878,050 * 3/1999 Brahme et al. .
5,946,697 * 8/1999 Shen .

OTHER PUBLICATIONS

"Apple Unveils ColorSync 2.5," Apple Press Release, Sep. 29, 1997.

* cited by examiner

Primary Examiner—Gopal C. Ray
(74) Attorney, Agent, or Firm—Sawyer Law Group, LLP

(57) ABSTRACT

Aspects for ensuring the integrity of a cache file utilized by an application program interface of a computer system are provided. A method aspect includes forming a checksum with a modification date value of each of a plurality of files, storing the checksum in the cache file, and utilizing the checksum to validate data in the cache file.

20 Claims, 2 Drawing Sheets

METHOD AND SYSTEM FOR ENSURING CACHE FILE INTEGRITY

FIELD OF THE INVENTION

The present invention relates to cache files, and more particularly to ensuring valid data in a cache file.

BACKGROUND OF THE INVENTION

Current computer systems provide individuals with opportunities to produce documents of professional quality, such as with desktop publishing software and graphics software programs. Input/Output (I/O) devices that support image input or output for production of such documents typically include, for example, monitors, printers, scanners, and digital cameras. Usually, a profile of each such I/O device known to the computer system is stored in the system, e.g., in a system folder, to identify particular characteristics of each device. By way of example, profiles typically include color matching information.

Color matching information is data, such as red, green, and blue (RGB) values and CMYK (cyan, magenta, yellow, black) values that are associated with objects and text in the document to control how the objects and text will appear when they are displayed and printed. Because RGB and CMYK values may differ depending on the particular device involved, color matching is offered as a standard component of some operating systems, such as through a ColorSync™ component of MacOS from Apple Computer, for example.

Utilization of the profiles normally occurs through the ColorSync™ component. ColorSync™ refers to a system level API (application program interface) that application programs and device drivers of a computer system call. A device profile typically provides a set of characteristics, such as RGB or CMYK values in the document, to describe the device to which the values are associated and enable the document to be portable, i.e., so that it will have the same appearance when drawn by different devices.

For example, application programs, such as Adobe Photoshop™, running on the computer system typically request a list of profiles in the computer system. Normally, ColorSync™ responds to such a request by opening every profile, retrieving the data, and returning it to the requesting application program. For systems with a small number of profiles, relatively little time is needed to perform these tasks. Unfortunately, performance speed becomes hampered as the number of profiles increases, e.g., to 100 or more.

One way of increasing performance includes the use of a cache file. Basically, the cache file stores the most necessary/desired information from each profile in a single file. Thus, requests for the profile data are responded to more quickly by retrieving the single cache file. While decreasing time constraints, use of the cache file is not without problems.

While cache files are intended to save time by putting frequently requested or slow to access information in a quickly accessible place, like a single file, the cache is only relevant as long as it accurately reflects the data it is meant to cache. To verify a cache file's integrity by brute force every time the cache file was used would significantly lower the benefit of the cache file. Further, to save time by rebuilding the cache file every time the system is booted, rather than every time the cache file is used, does not guarantee integrity, since changes can be made after booting that would not be reflected until the next next boot. Also, such rebuilding of the cache file is inefficient when no change has been made.

Accordingly, a need exists for an efficient, reliable, and accurate manner of utilizing a cache file. The present invention addresses such a need.

SUMMARY OF THE INVENTION

The present invention provides aspects for ensuring the integrity of a cache file utilized by an application program interface of a computer system. A method aspect includes forming a checksum with a modification date value of each of a plurality of files, storing the checksum in the cache file, and utilizing the checksum to validate data in the cache file.

With the present invention, a relatively quick calculation utilizing modification dates determines whether a cache file is up-to-date with a large measure of confidence. The maintenance of modification dates by a computer's file manager, combined with the ease with which the modification dates may be accessed, results in a convenient and reliable access point to profiles in a system that facilitates cache file integrity determinations. These and other advantages of the aspects of the present invention will be more fully understood in conjunction with the following detailed description and accompanying drawings.

DESCRIPTION OF THE INVENTION

The present invention relates to ensuring valid data in a cache file. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
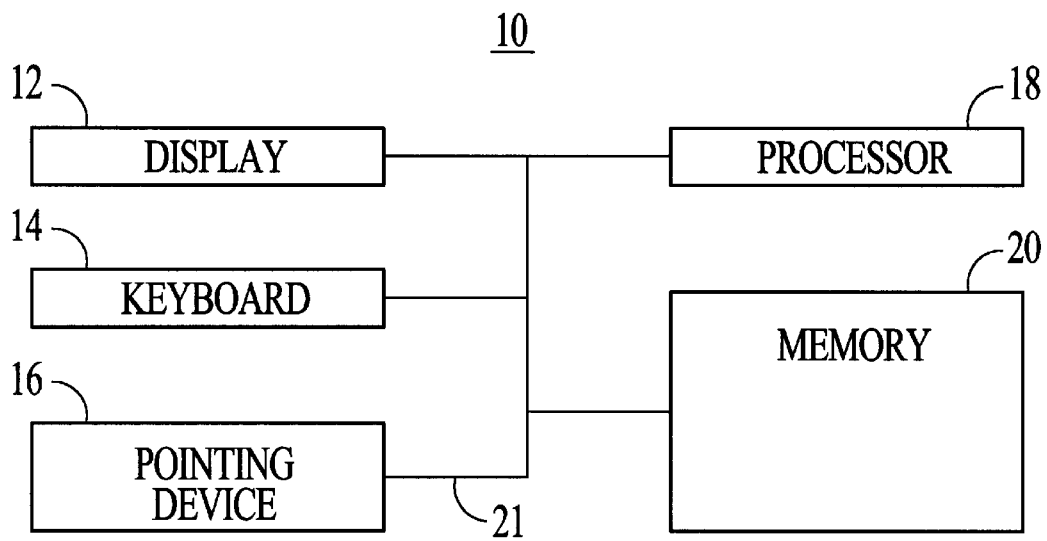
FIG. 1 is a block diagram illustrating a computer system in accordance with the present invention.

FIG. 1 is a block diagram illustrating a computer system 10, e.g., a Macintosh computer available from Apple Computer, Cupertino, Calif., which includes a display 12, a keyboard 14, a pointing device 16, a processor 18, and a memory 20, which are all connected by a bus 21. The processor 18 operates in accordance with an operating system in conjunction with the memory 20 to execute operations, such as those provided by an application program that enables a user to create and manipulate graphics and text, as is well understood by those skilled in the art. In a preferred embodiment, the operating system includes a component, e.g., ColorSync™ 2.5, that achieves a system level API for image manipulation with enhanced features over prior versions of such an API.

It should be appreciated that although the following is described with reference to ColorSync™ 2.5, any system level API that is suitably utilized to achieve similar functionality in a computer system is also included in the present description. Thus, the following is meant to be illustrative and not restrictive of the present invention. Therefore, for purposes of this disclosure, ColorSync™ 2.5 is suitably referred to herein as a color management API. Further, although the maintenance of cache file integrity is described herein in a preferred embodiment of a color management API, the principles of ensuring a cache file's integrity may be suitably applied to other management environments, e.g., font management.

Figure 2:
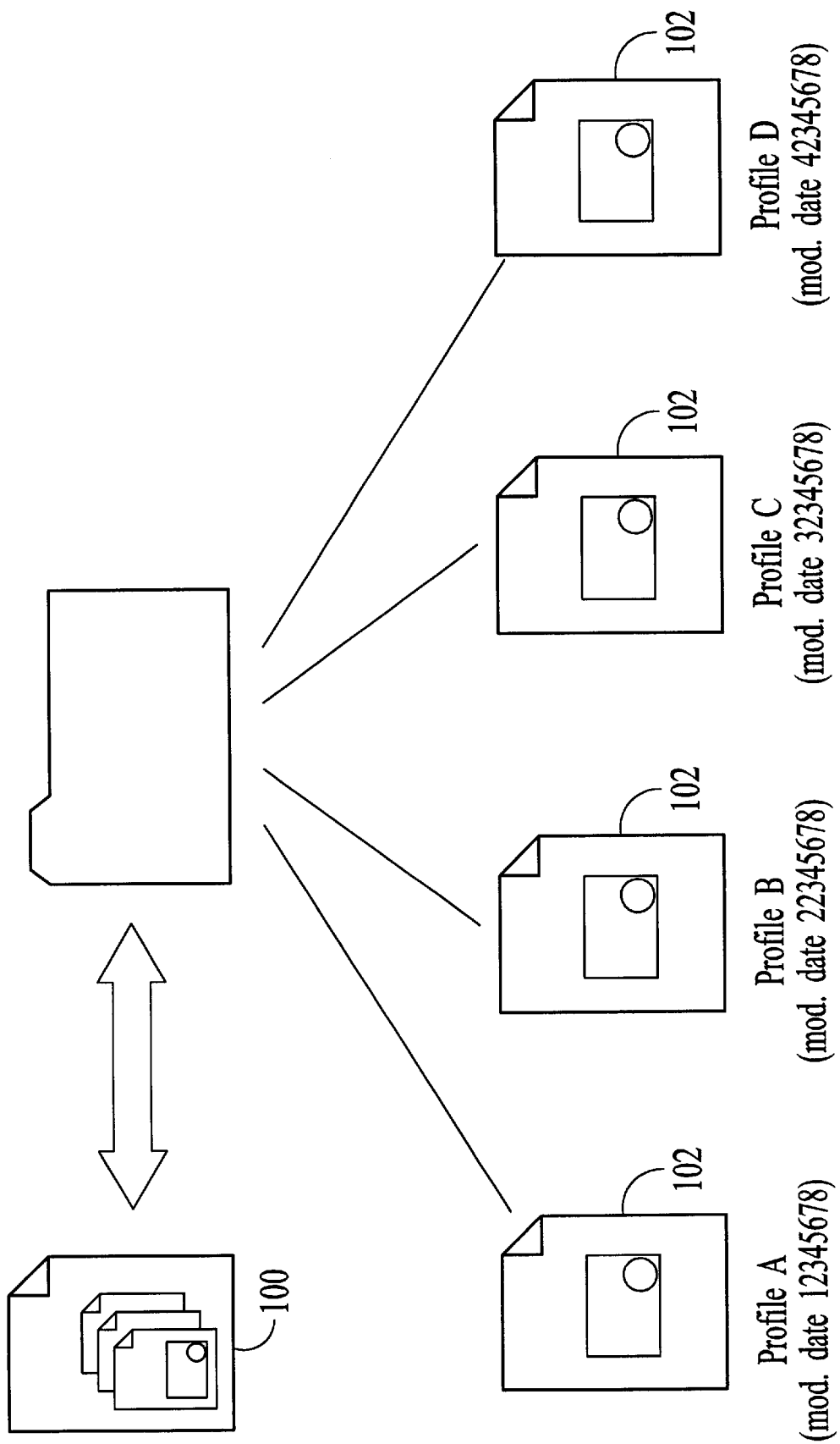
FIG. 2 illustrates a relationship between a cache file and one or more profiles.

When using an application program that supports the color management API, preferably a call to the color management API results in accessing of a cache file. The file-based cache includes a mechanism for ensuring the integrity of the data in the cache. In a preferred embodiment, integrity of the cache file is maintained through the use of a modification seed. In general, a preferred embodiment uses the file modification date of a group of files in order to generate a unique seed. The seed is then saved in the cache file. FIG. 2 illustrates a relationship between a cache file 100 and one or more profiles 102. The profiles include those aliased and in subfolders. For such a multi-level file architecture, the cache must be able to synchronize with external events, such as when a new profile is added to a folder or user adds an alias in a folder, as is well appreciated by those skilled in the art. Modification dates (mod. dates) for each profile 102 are suitably provided as a standard function of the computer system 10 storing the profiles. Thus, the maintenance of file modification dates occurs by a computer's file system, so that any time an application modifies a file, the file manager updates the file's modification date. Preferably, the cache file 100 stores the seed, i.e., a checksum resulting from the performance of an exclusive-ORing (XORing) function of the modification dates from each of the profiles 102, when the cache file 100 is created, e.g., when the color management API first builds a profiles list.

Figure 3:
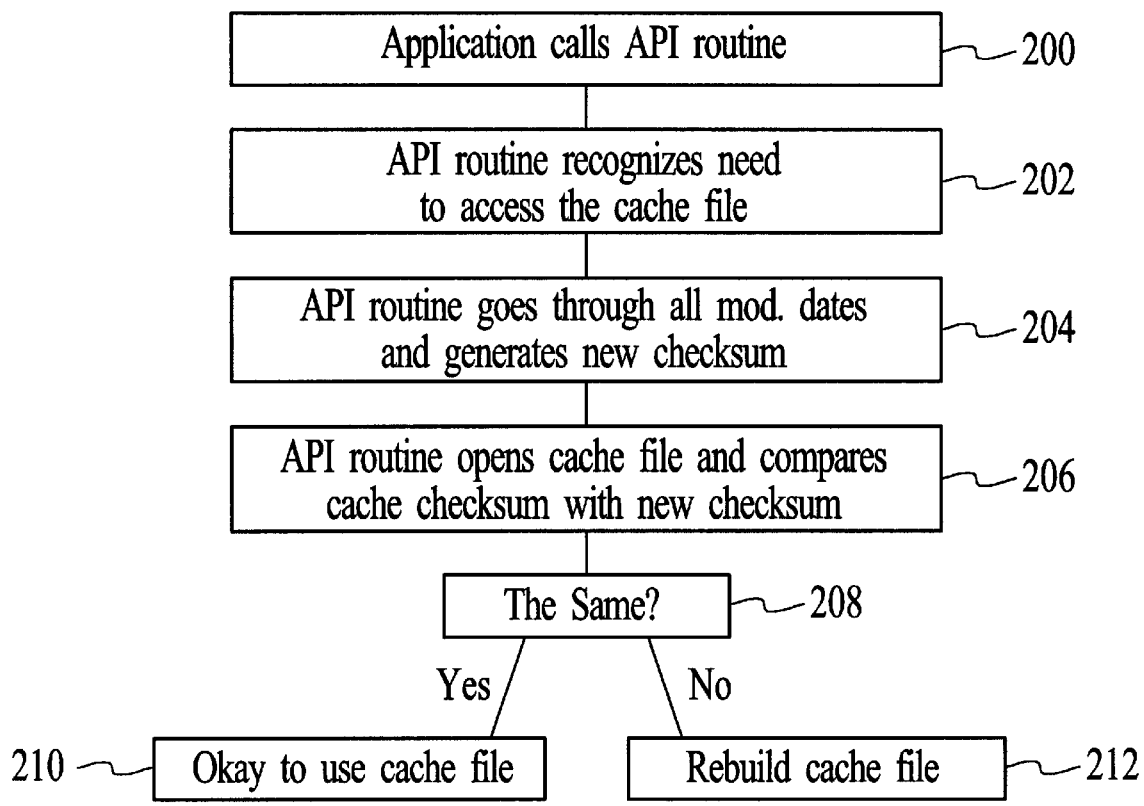
FIG. 3 illustrates a flow diagram for identifying the integrity of the cache file of FIG. 2.

When the cache file 100 is subsequently utilized, a process for verifying the checksum is preferably performed, as described with reference to FIG. 3. The process is suitably stored in a computer readable medium, e.g., memory 20 (FIG. 1), a floppy disk, etc. When an application calls the color management API routine (step 200), the color management API accesses the cache file 100 (step 202). The color management API then suitably forms a new checksum with the modification dates from all the profiles currently in the system (step 204). Opening of the cache file 100 occurs to retrieve the stored checksum for comparison with the new checksum (step 206). When the stored checksum and new checksum are the same, as determined via step 208, the cache file 100 is considered valid and provided in quick response to the application program (step 210). When there is a mismatch, as determined via step 208, the cache file 100 is considered invalid, e.g., a modification date of one of the profiles has changed, and the cache file 100 is rebuilt (step 212). Thus, the frequently used data from each of the profiles 102, e.g., device name, device type, etc., is retrieved, as well as the modification dates, with the modification dates then appropriately combined as described above to form a new checksum for storage in the rebuilt cache file.

The use of the modification date provides a straightforward and reliable method of ensuring the integrity of the data in the cache file. The length of the modification date, e.g., 4 bytes, creates a statistically low probability (approximately 1 in 4.2 billion) that a false positive match result would occur. For example, a false positive match could result when profiles change in a way that mathematically results in a checksum that matches a stored checksum, e.g., when two profiles with matching modification dates are removed from the system. To avoid integrity errors from such an unlikely set of circumstances, suitably inclusion of the number of profiles as a value in the checksum determination occurs.

Further, while other methods of utilizing the modification date information could be considered, the preferred embodiment avoids less attractive features of other utilizations. For example, a summing operation of the modification dates could be performed to generate a unique number. However, the length of the modification date inhibits such an operation. Alternatively, all of the modification dates for each of the profiles could be saved and then compared. Again, having such long numbers would require significant storage space, while not providing any serious advantage. In contrast, the checksum in the preferred embodiment is easily accessible from the cache file, thus providing a fast and accurate representation of the cache file integrity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for ensuring the integrity of a cache file utilized by an application program interface (API) of a computer system, the method comprising:

forming a checksum with a modification date value of each of a plurality of files;

storing the checksum in the cache file; and utilizing the checksum to validate data in the cache file.

2. The method of claim 1 wherein the step of utilizing further comprises:

accessing the cache file to identify the checksum;

determining a new checksum; and comparing the new checksum with the checksum.

3. The method of claim 2 further comprising rebuilding the cache file when the new checksum does not match the checksum.

4. The method of claim 3 further comprising continuing operation with the cache file when the new checksum does match the checksum.

5. The method of claim 2 wherein the step of determining a new checksum further comprises performing an exclusive-OR operation with the modification date value of each of the plurality of files.

6. The method of claim 1 wherein the plurality of files further comprises a plurality of device profiles.

7. The method of claim 6 wherein a color management API forms the checksum when building a list of device profiles.

8. A computer system that maintains the integrity of a cache file, the computer system comprising:

a processor operating with an operating system, the operating system including an application program interface (API); and memory, the memory storing data for utilization by the processor, the data including a cache file utilized by the API, wherein the cache file includes a modification seed for validating data in the cache file.

9. The computer system of claim 8 wherein the API comprises a color management API.

10. The computer system of claim 8 wherein the modification seed further comprises a checksum.

11. The computer system of claim 10 wherein the checksum results from a combination of a modification date from each of a plurality of files.

12. The computer system of claim 11 wherein the plurality of files further comprises a plurality of device profiles.

13. The computer system of claim 12 wherein the checksum results from an exclusive-OR operation.

14. The computer system of claim 13 wherein the cache file becomes invalid when the checksum changes.

15. A computer readable medium containing program instructions for ensuring the integrity of a cache file utilized by an application program interface (API) of a computer system, the instructions comprising:

forming a checksum with a modification date value of each of a plurality of files;

storing the checksum in the cache file; and utilizing the checksum to validate data in the cache file.

16. The instructions of claim 15 wherein the step of utilizing further comprises:

accessing the cache file to identify the checksum;

determining a new checksum; and comparing the new checksum with the checksum.

17. The instructions of claim 16 further comprising rebuilding the cache file when the new checksum does not match the checksum.

18. The instructions of claim 17 further comprising continuing operation with the cache file when the new checksum does match the checksum.

19. The instructions of claim 16 wherein the step of determining a new checksum further comprises performing an exclusive-OR operation with the modification date value of each of the plurality of files.

20. The instructions of claim 15 wherein the plurality of files further comprises a plurality of device profiles.

* * * * *